(12) United States Patent
Kitamura et al.

(10) Patent No.: US 10,574,111 B2
(45) Date of Patent: Feb. 25, 2020

(54) ROTATING ELECTRIC MACHINE WITH LANE-CHANGED COILS

(71) Applicant: Mitsubishi Electric Corporation, Tokyo (JP)

(72) Inventors: Ryuji Kitamura, Tokyo (JP); Shogo Okamoto, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1 day.

(21) Appl. No.: 15/577,386

(22) PCT Filed: Oct. 29, 2015

(86) PCT No.: PCT/JP2015/080551
§ 371 (c)(1),
(2) Date: Nov. 28, 2017

(87) PCT Pub. No.: WO2017/072912
PCT Pub. Date: May 4, 2017

(65) Prior Publication Data
US 2018/0226852 A1 Aug. 9, 2018

(51) Int. Cl.
*H02K 3/28* (2006.01)
*H02K 1/16* (2006.01)
*H02K 3/12* (2006.01)

(52) U.S. Cl.
CPC .............. *H02K 3/28* (2013.01); *H02K 1/16* (2013.01); *H02K 3/12* (2013.01); *H02K 2203/12* (2013.01)

(58) Field of Classification Search
CPC ................. H02K 3/28; H02K 3/12; H02K 3/522; H02K 15/095; H02K 15/08; H02K 1/16; H02K 2203/12
(Continued)

(56) References Cited

U.S. PATENT DOCUMENTS

2009/0243420 A1 10/2009 Hoshino et al.
2012/0286593 A1 11/2012 Yokogawa et al.
(Continued)

FOREIGN PATENT DOCUMENTS

JP 2002-354738 A 12/2002
JP 2005-012876 A 1/2005
(Continued)

OTHER PUBLICATIONS

International Search Report for PCT/JP2015/080551, dated Feb. 2, 2016.

*Primary Examiner* — Michael Andrews
(74) *Attorney, Agent, or Firm* — Sughrue Mion, PLLC; Richard C. Turner

(57) ABSTRACT

A stator coil has a first layer wound around a tooth portion of a stator core-sequentially from the radially outer side to the radially inner side of a stator, and is wound while a winding direction is reversed for each layer. If the outermost layer is denoted by n (n is an odd number equal to or greater than 3) and the final turn in each layer is denoted by m (m is equal to or greater than 2), the m-th turn in the n-th layer is wound on the radially outer side of the stator, the stator coil on the radially inner side is lane-changed on a shorter-side tooth portion, and a part of the stator coil on the radially outer side in the outermost layer is lane-changed on a longer-side tooth portion.

6 Claims, 9 Drawing Sheets

(58) Field of Classification Search
USPC .......................................... 310/208; 29/596
See application file for complete search history.

(56) References Cited

U.S. PATENT DOCUMENTS

| | | | |
|---|---|---|---|
| 2012/0293024 A1* | 11/2012 | Yokogawa | H02K 1/278 310/43 |
| 2015/0028715 A1* | 1/2015 | Tsuiki | H02K 3/522 310/208 |
| 2016/0118852 A1 | 4/2016 | Uno et al. | |
| 2017/0141634 A1* | 5/2017 | Honda | H02K 15/095 |

FOREIGN PATENT DOCUMENTS

| | | |
|---|---|---|
| JP | 2011-205876 A | 10/2011 |
| JP | 5315743 B2 | 10/2013 |
| JP | 2014-166102 A | 9/2014 |
| WO | 2013/190673 A1 | 12/2013 |
| WO | 2015/063877 A1 | 5/2015 |

* cited by examiner

ROTATING ELECTRIC MACHINE WITH LANE-CHANGED COILS

CROSS REFERENCE TO RELATED APPLICATIONS

This application is a National Stage of International Application No.PCT/JP2015/080551 filed Oct. 29, 2015,the contents of all of which are incorporated herein by reference in their entirety.

TECHNICAL FIELD

The present invention relates to a rotating electric machine for use in vehicles, and in particular, relates to a stator structure of a rotating electric machine.

BACKGROUND ART

In conventional stators of rotating electric machines, a coil is often configured such that lane change is performed on the longer side because winding is easy. However, there is a problem that the coil swells in the circumferential direction and thus the space factor of the coil decreases. Therefore, in recent years, lane change is performed on the shorter side, whereby there is an advantage that the coil does not swell in the circumferential direction and a winding having a high space factor can be obtained (see Patent Document 1).

CITATION LIST

Patent Document

Patent Document 1: Japanese Patent No. 5315743

SUMMARY OF THE INVENTION

Problems to be Solved by the Invention

However, a stator in which lane change is performed on the shorter side as disclosed in Patent Document 1 has a problem that the coil height on the shorter side becomes great.

The present invention has been made to solve the above problem, and an object of the present invention is to obtain a stator of a rotating electric machine that enables increase in the space factor of a coil and reduction in the coil height on the shorter side.

Solution to the Problems

A rotating electric machine according to the present invention includes: a housing storing an entirety thereof; a rotor rotatably attached to the housing via a rotational shaft; and a stator attached to the housing so as to be opposed to an outer circumference of the rotor. The stator includes: an annular stator core fixed to the housing and having tooth portions forming a plurality of slots; and a plurality of stator coils wound around the tooth portions via bobbins formed from an insulating material made of resin. Each stator coil has a first layer wound around the tooth portion sequentially from a radially outer side to a radially inner side of the stator, and is wound while a winding direction is reversed for each layer. If an outermost layer is denoted by n, where n is an odd number equal to or greater than 3, a final turn in each layer is denoted by m, where m is equal to or greater than 2, a first turn in the first layer is denoted by (1, 1), a second turn in the first layer is denoted by (1, 2), a first turn in a second layer is denoted by (2, 1), a second turn in the second layer is denoted by (2, 2), . . . , and the m-th turn in the n-th layer is denoted by (n, m), the m-th turn (n, m) in the n-th layer is wound on a radially outer side of the stator, each stator coil on the radially inner side is lane-changed on a shorter-side tooth portion, and a part of each stator coil on the radially outer side is lane-changed on a longer-side tooth portion.

Effect of the Invention

According to the present invention, the final turn in the outermost layer of each stator coil is lane-changed on the longer side and the other turns is lane-changed on the shorter side. Thus, it becomes possible to obtain a stator of a rotating electric machine that enables increase in the space factor of the stator coil and reduction in the stator coil height on the shorter side.

DESCRIPTION OF EMBODIMENTS

Hereinafter, the present invention will be described with reference to FIG. 1 to FIG. 7 showing embodiment 1.

Embodiment 1

Figure 1:
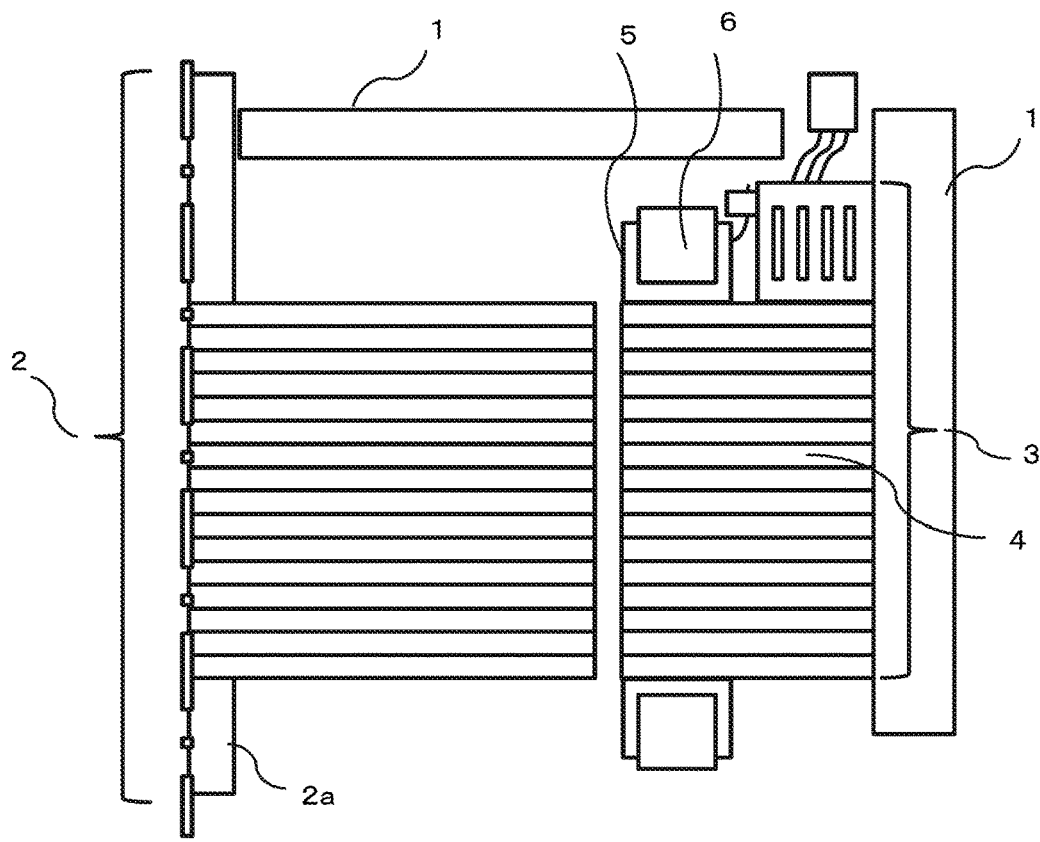
FIG. 1 is a major part sectional view showing the entire structure of a rotating electric machine according to embodiment 1 of the present invention.
Figure 2:
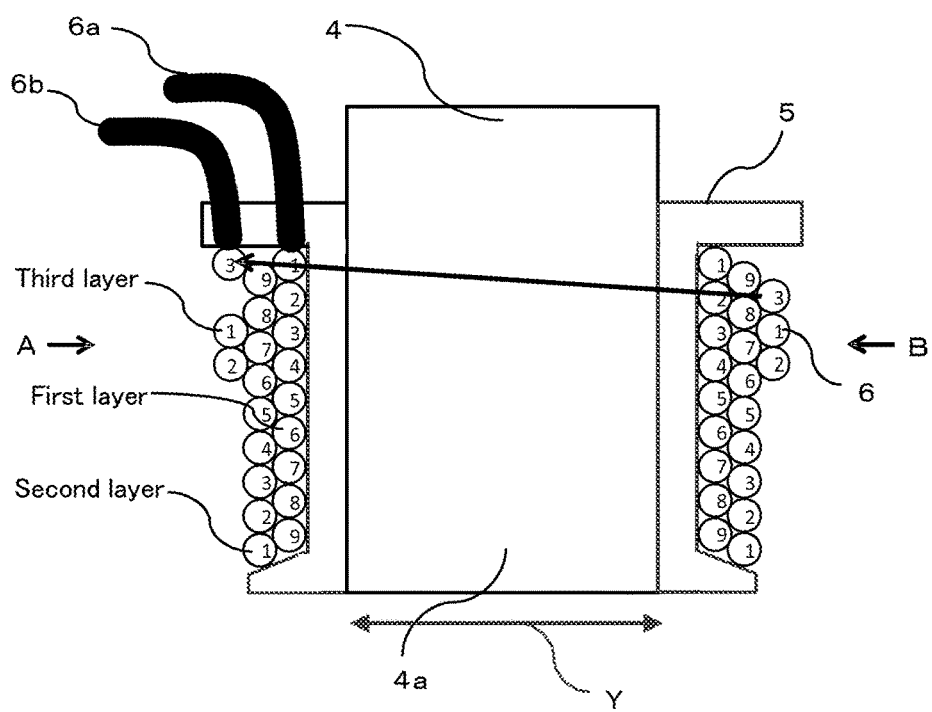
FIG. 2 is a sectional view showing a major part structure of the stator shown in FIG. 1.
Figure 3A:
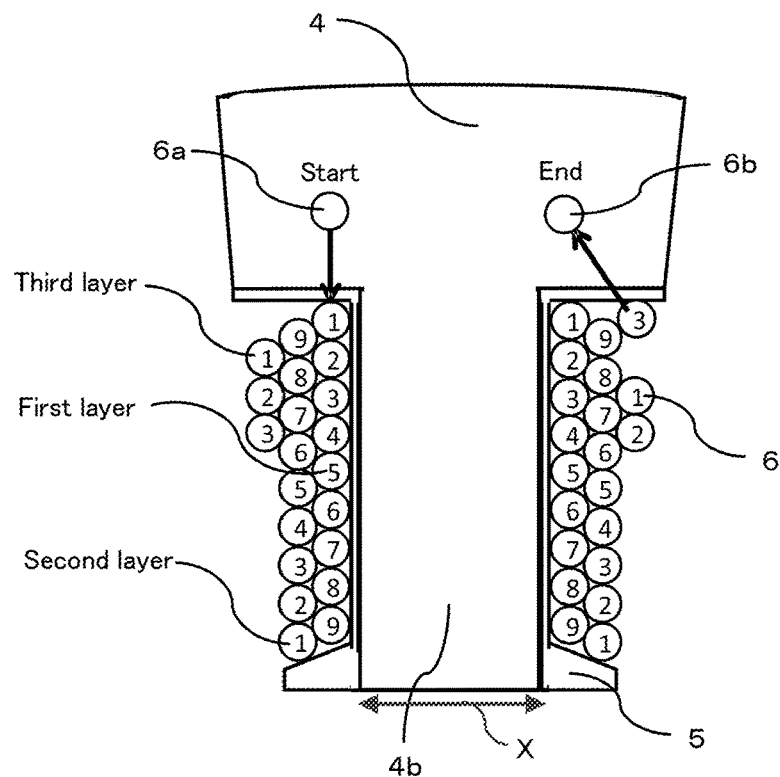
FIG. 3A is a sectional view of the stator as seen from direction A in FIG. 2.
Figure 3B:
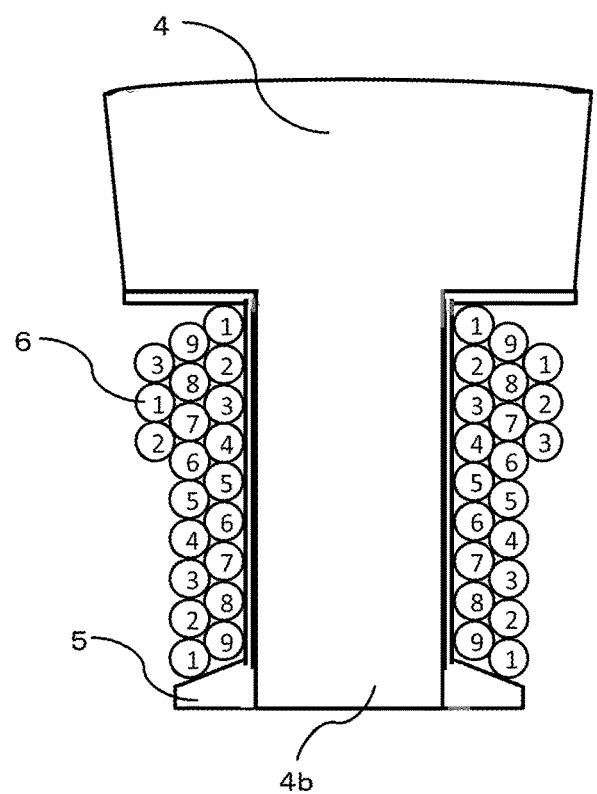
FIG. 3B is a sectional view of the stator as seen from direction B in FIG. 2.
Figure 4A:
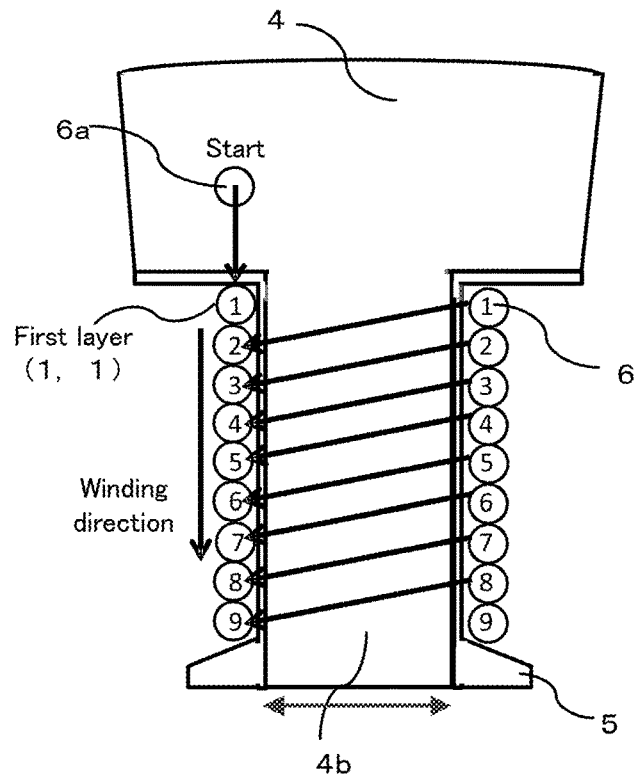
FIG. 4A is a schematic sectional view as seen from direction A in FIG. 2 and illustrates a winding step for a first layer of a stator coil in embodiment 1 of the present invention.
Figure 4B:
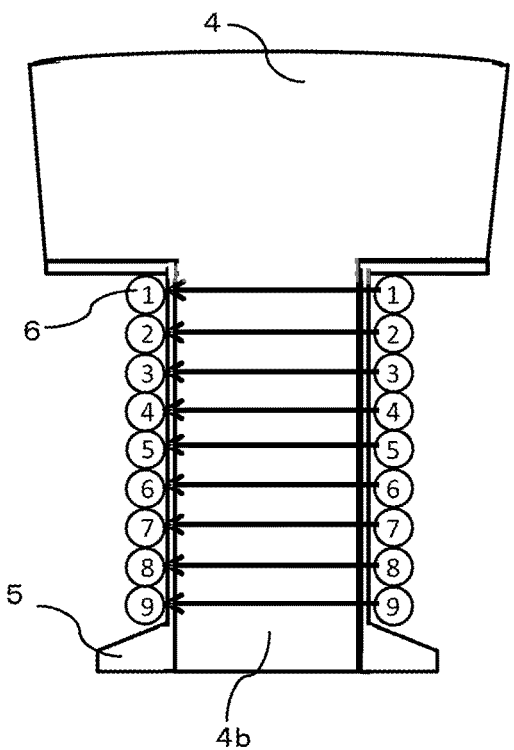
FIG. 4B is a schematic sectional view as seen from direction B in FIG. 2 and illustrates the winding step for the first layer of the stator coil in embodiment 1 of the present invention.
Figure 5A:
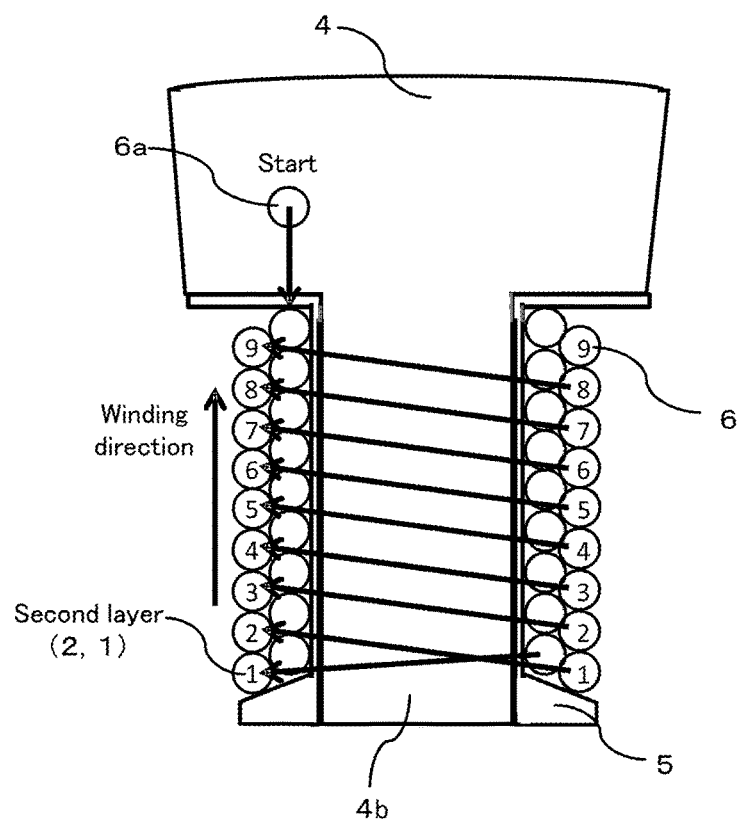
FIG. 5A is a schematic sectional view as seen from direction A in FIG. 2 and illustrates a winding step for a second layer of the stator coil in embodiment 1 of the present invention.
Figure 5B:
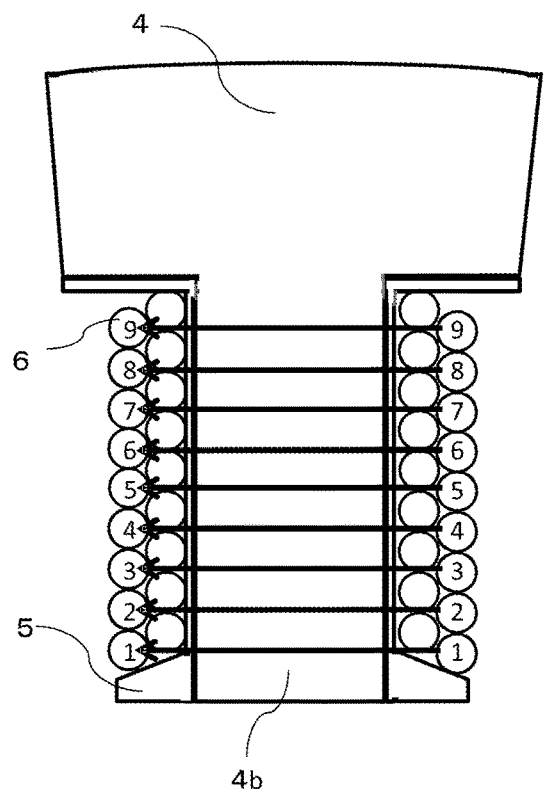
FIG. 5B is a schematic sectional view as seen from direction B in FIG. 2 and illustrates the winding step for the second layer of the stator coil in embodiment 1 of the present invention.

FIG. 1 is a major part sectional view showing the entire structure of a rotating electric machine according to embodiment 1 of the present invention. FIG. 2 is a sectional view showing a major part structure of the stator shown in FIG. 1. FIG. 3A and FIG. 3B are sectional views of the stator as seen from directions A, B in FIG. 2, respectively. FIG. 4A and FIG. 4B are schematic sectional views as seen from directions A, B in FIG. 2, respectively, and illustrate a winding step for a first layer of a stator coil according to embodiment 1 of the present invention. FIG. 5A and FIG. 5B are schematic sectional views as seen from directions A, B in FIG. 2, respectively, and illustrate a winding step for a second layer of the stator coil according to embodiment 1 of the present invention. FIG. 6A, FIG. 6B, FIG. 7A, and FIG. 7B are schematic sectional views as seen from directions A, B in FIG. 2, respectively, and illustrate a winding step for a third layer of the stator coil in FIG. 2.

In FIG. 1, the rotating electric machine is a vehicular rotating electric machine for low-voltage large-current usage, and includes: a housing 1 storing the entirety thereof; a rotor 2 rotatably attached to the housing 1 via a rotational shaft 2a; and a stator 3 attached to the housing 1 so as to be opposed to the outer circumference of the rotor 2. The stator 3 has an annular stator core 4 fixed to the housing 1, and a plurality of stator coils 6 provided to the stator core 4 via bobbins 5 formed from an insulating material made of resin.

Here, the stator core 4 is formed by stacking thin electromagnetic steel sheets and integrally assembling them by swaging or welding into a cylindrical shape, and the stator coil 6 is formed from a wire material having a large diameter because large current flows therethrough.

As shown in detail in FIG. 2, the stator core 4 has tooth portions 4a forming a plurality of slots in the circumferential direction, and the bobbin 5 is mounted to the side surface of each tooth portion 4a. Further, the stator coil 6 coated with an insulating film is wound around the bobbin 5. A first turn (1, 1) in a first layer of the stator coil 6 is wound on the outermost circumferential side of the bobbin 5. A second turn (1, 2) in the first layer is wound on the radially inner side of the first turn (1, 1). Then, a first turn (2, 1) in a second layer, a second turn (2, 2) in the second layer, . . . , an m-th turn (n, m) in an n-th layer are sequentially wound. Here, n is an odd number equal to or greater than 3, and m is equal to or greater than 2.

In the present embodiment 1, the first layer is formed of nine turns in total, the second layer is formed of nine turns in total, and the final third layer is formed of three turns in total. Terminal wires 6a, 6b to be connected to wire connection members are led out from the winding start turn and the winding final turn of the stator coil 6. The stator core 4 has a rectangular shape formed by longer-side tooth portions 4a having a size of width Y, and shorter-side tooth portions 4b of which a width X in the circumferential direction is made smaller than the width Y in order to form the plurality of slots as shown in FIG. 3A and FIG. 3B, and in addition, the stator core 4 has such a trapezoidal shape that the radially inner end of the shorter-side tooth portion 4b is smaller than the radially outer side thereof.

Next, the details of a winding step for the stator coil 6 described above will be described.

First, as shown in FIG. 4A and FIG. 4B, the terminal wire 6a in the winding start turn is introduced to the tooth portion 4b from the radially outermost side of the stator core 4, and the first turn is sequentially wound from a radially outer side (1, 1) to a radially inner side (1, 9) of the stator core 4. Here, lane change for moving the winding position radially inward is performed on one shorter-side tooth portion 4b. Next, as shown in FIG. 5A and FIG. 5B, the wire for the second layer is sequentially wound from a radially inner side (2, 1) to a radially outer side (2, 9) of the stator core 4. Also in the second layer, lane change for moving the winding position radially outward is performed on the one shorter-side tooth portion 4b.

Figure 6A:
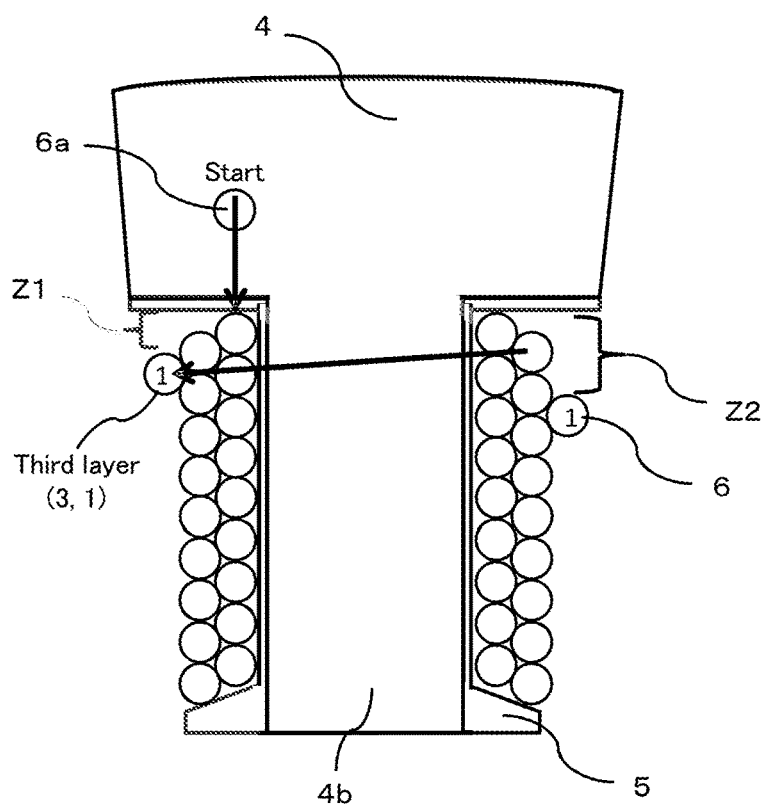
FIG. 6A is a schematic sectional view as seen from direction A in FIG. 2 and illustrates a winding step for a third layer of the stator coil in embodiment 1 of the present invention.
Figure 6B:
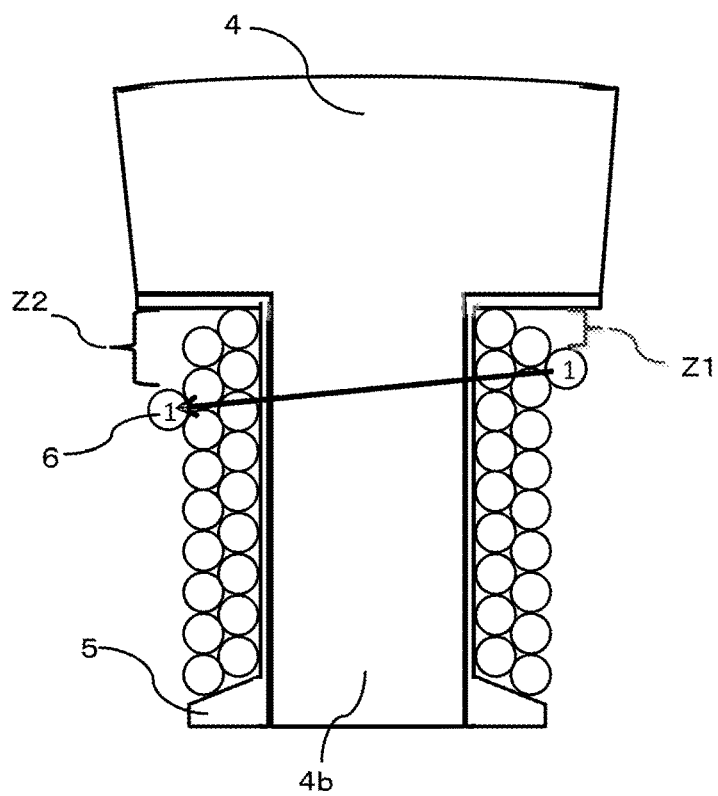
FIG. 6B is a schematic sectional view as seen from direction B in FIG. 2 and illustrates the winding step for the third layer of the stator coil in embodiment 1 of the present invention.

Next, at the time of shifting to the shorter-side tooth portion 4b from the longer-side tooth portion 4a when a first turn (3, 1) in a third layer is to be wound from the final turn (2, 9) in the second layer, as shown in FIG. 6A and FIG. 6B, the wire is wound so as to provide a gap Z1 corresponding to one coil wire on the radially outermost side on the one shorter-side tooth portion 4b. In addition, at the time of winding from the other shorter-side tooth portion 4b to the longer-side tooth portion 4a, the wire is wound so as to provide a gap Z2 corresponding to two coil wires on the radially outermost side.

Figure 7A:
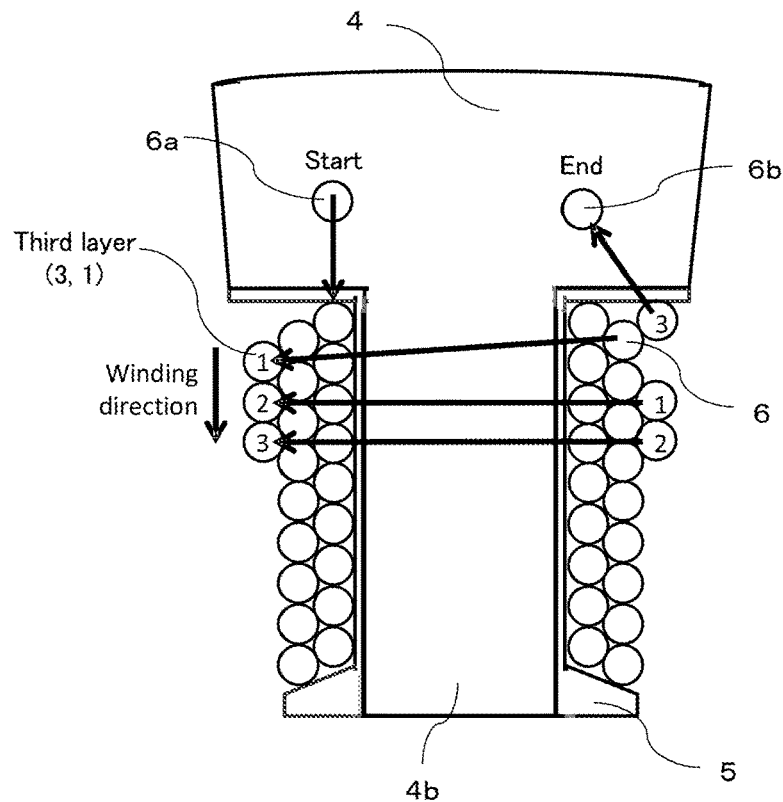
FIG. 7A is a schematic sectional view as seen from direction A in FIG. 2 and illustrates the winding step for the third layer of the stator coil in embodiment 1 of the present invention.
Figure 7B:
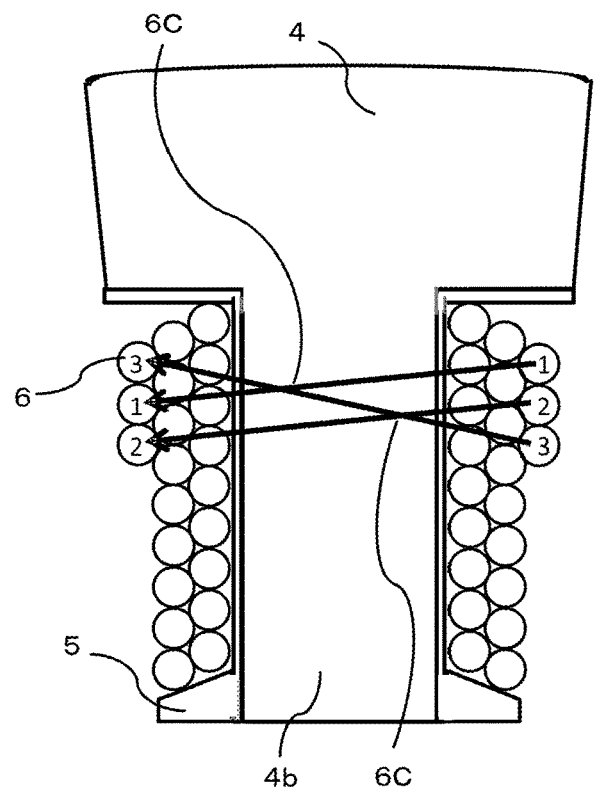
FIG. 7B is a schematic sectional view as seen from direction B in FIG. 2 and illustrates the winding step for the third layer of the stator coil in embodiment 1 of the present invention.

Further, at the time of winding from a second turn (3, 2) to a third turn (3, 3) in the third layer, the wire is sequentially wound from the radially outermost side to the radially inner side of the stator core 4, and lane change is performed on the one shorter-side tooth portion 4b. Thereafter, as shown in FIG. 7A and FIG. 7B, in the third turn (3, 3) in the third layer, lane change is performed on the other shorter-side tooth portion 4b, from the radially innermost side to the radially outer side at the gap Z2 corresponding to two coil wires, and then the coil is wound to the longer-side tooth portion 4a.

Normally, when a stator coil having a large wire diameter is wound on the radially outermost side, the introduction angle of the stator coil becomes large and the stator coil interferes with the stator core 4 or the bobbin 5, and therefore it is difficult to wind the coil. However, after the coil is wound on the radially inner side of the gap Z2 corresponding to two coil wires, lane change is performed on the longer-side tooth portion 4a from the radially inner side to the radially outer side of the stator core 4, whereby the coil can be wound on the radially outermost side without passing above the final turn (2, 9) in the second layer of the stator coil, and the winding end terminal wire 6b is led out from the third turn (3, 3) in the third layer. In addition, in winding from the first turn (3, 1) in the third layer to the third turn (3, 3) in the third layer, cross portions 6c due to lane change formed by turns in the same layer are formed on only the other shorter-side tooth portion 4b opposite to the tooth portion 4b where the terminal wires 6a, 6b are led out. Therefore, as is obvious from FIG. 7A and FIG. 7B, the stator coil height on the terminal wire 6a, 6b side becomes lower by about one coil wire than the stator coil height on the opposite side.

Embodiment 1 of the present invention configured as described above provides the following effects.

(1) When plural turns of wire are wound in the outermost layer which is an odd-numbered layer, as shown in FIG. 3A, the final turn (m, n) in the outermost layer is located on the radially outer side, whereby leading-out of the terminal wires 6a, 6b can be facilitated.

(2) Each slot formed by the tooth portions has a trapezoidal shape, and the radially inner side of the stator core 4 is narrow and the radially outer side is wide. Therefore, if lane change on the longer-side tooth portion 4a is performed at the gap present on the radially outer side, it becomes possible to use a coil wire having a larger wire diameter as compared to the case where the lane change on the longer side is performed at a position where the gap is small on the radially-inner-side tooth portion 4b, and thus the space factor can be improved.

Figure 11:
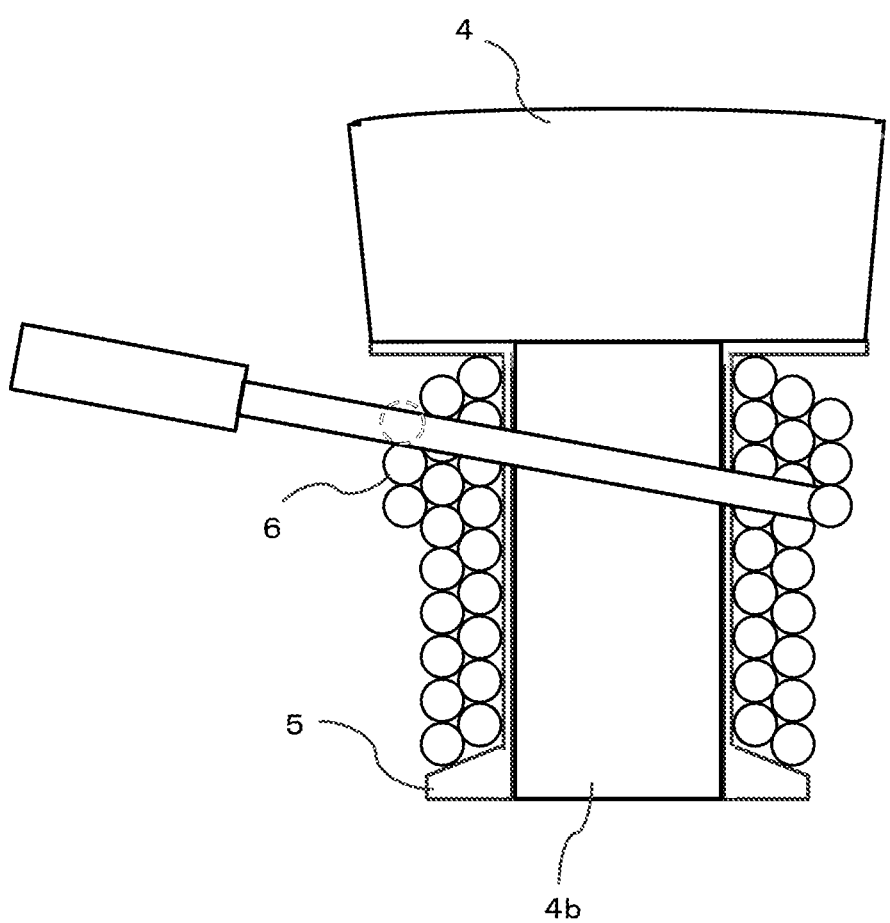
FIG. 11 is a sectional view illustrating a winding step for a stator coil.

(3) In the case where the stator coil 6 having a large wire diameter is wound from the radially inner side to the radially outermost side, the introduction angle of the stator coil 6 becomes large and the stator coil 6 interferes with the stator core 4 or the bobbin 5, and therefore it is difficult to wind the coil. However, as shown in FIG. 11, since lane change is performed on the longer-side tooth portion 4a, the winding becomes possible.

(4) The cross portions due to lane change in the same layer are formed on only one shorter-side tooth portion. Therefore, the height in the axial direction of the stator coil can be reduced as compared to the case of having the cross portions at both ends in the axial direction along the rotational shaft 2a.

(5) By performing lane change on the longer-side tooth portion 4a, as shown in FIG. 2 and FIG. 3A, when the winding end terminal wire 6b is led out from the final turn (3, 3) in the outermost layer, the winding end terminal wire 6b can be led out from the radially outermost side without passing above the final turn (2, 9) in the second layer of the stator coil. Therefore, the height of the stator coil is reduced, whereby the size of the rotating electric machine in the direction along the rotational shaft can be reduced.

(6) When plural turns of wire are wound in the outermost layer which is the odd-numbered layer, as shown in FIG. 6A and FIG. 7A, by providing the gap Z2 on the radially outer side, the final turn (m, n) in the outermost layer can be located at the gap on the radially outer side, whereby leading-out of the winding end terminal wire 6b can be facilitated.

(7) When plural turns of wire are wound in the outermost layer which is the odd-numbered layer and the final turn (m, n) in the outermost layer is located on the radially outer side, winding for the part other than the vicinity of the final turn is performed through lane change corresponding to one stator coil wire. Thus, the winding can be simplified.

(8) Each slot has a trapezoidal shape, and the radially inner side of the stator core 4 is narrow and the radially outer side thereof is wide. Therefore, if lane change on the longer side is performed at the gap present on the radially outer side, it becomes possible to use a wire having a larger diameter as compared to the case where the lane change on the longer side is performed at a position where the gap is small on the radially inner side, and thus the space factor of the stator coil can be improved.

(9) In the final third turn (3, 3) in the third layer which is the outermost layer, lane change is performed on the longer-side tooth portion 4a. Therefore, when the winding end terminal wire 6b is led out from the final third turn (3, 3), the winding end terminal wire 6b can be led out from the radially outermost side without passing above the final turn (2, 9) in the second layer of the stator coil. Thus, the stator coil height is reduced, and the size of the rotating electric machine in the direction along the rotational shaft can be reduced.

Embodiment 2

Figure 8:
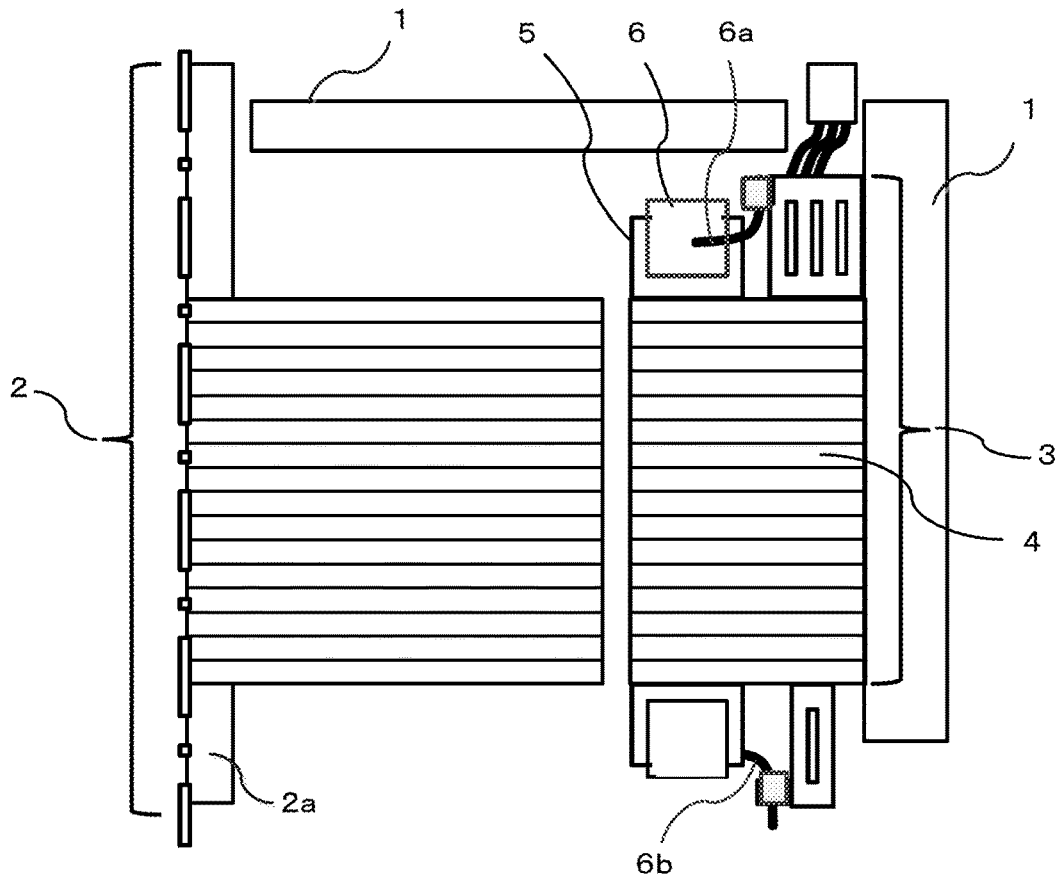
FIG. 8 is a major part sectional view showing the entire structure of a rotating electric machine according to embodiment 2 of the present invention.
Figure 9:
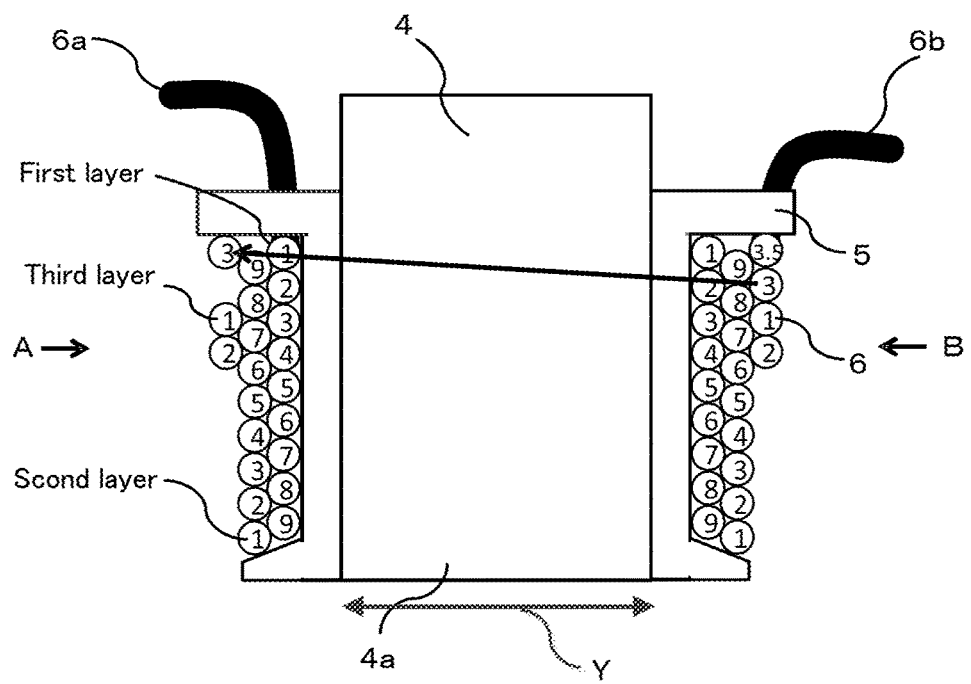
FIG. 9 is a sectional view showing a major part structure of the stator shown in FIG. 8.
Figure 10A:
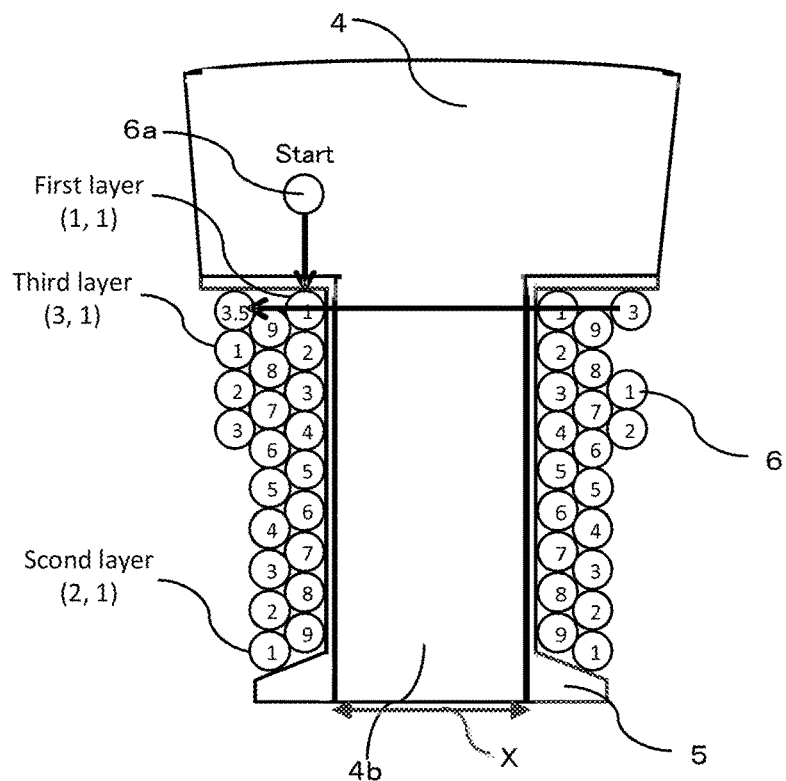
FIG. 10A is a sectional view of the stator as seen from direction A in FIG. 9.
Figure 10B:
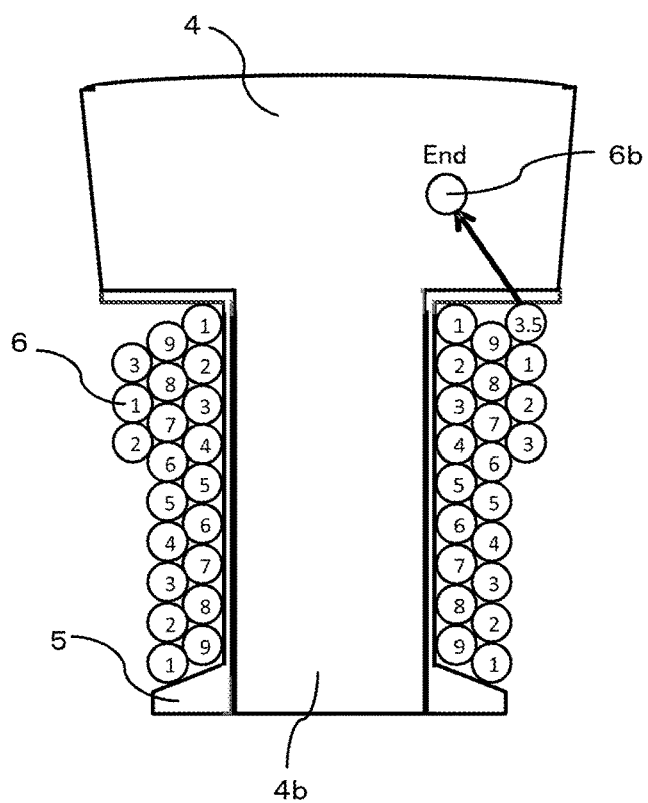
FIG. 10B is a sectional view of the stator as seen from direction B in FIG. 9.

FIG. 8 is a major part sectional view showing the entire structure of a rotating electric machine according to embodiment 2 of the present invention. FIG. 9 is a sectional view showing a major part structure of a stator in FIG. 8. FIG. 10A is a sectional view of the stator as seen from direction A in FIG. 9. FIG. 10B is a sectional view of the stator as seen from direction B in FIG. 9.

In embodiment 1, the terminal wire 6a in the winding start turn and the terminal wire 6b in the final turn are led out from the same direction of the tooth portion 4b. On the other hand, in embodiment 2, as shown in FIG. 8, the terminal wire 6a and the terminal wire 6b are led out from the tooth portions 4b at both ends in the axial direction along the rotational shaft 2a (i.e., led out from the upper and lower sides of the stator core 4 in FIG. 8). In addition, due to this configuration, the final turn in the third layer which is the outermost layer is wound with half extra revolution. The other configuration is the same as in embodiment 1.

Here, in the present embodiment 2, the first layer is formed of nine turns in total, the second layer is formed of nine turns in total, and the final third layer is formed of 3.5 turns in total.

Next, the details of a winding step for the stator coil 6 described above will be described.

First, as shown in FIG. 10A and FIG. 10B, the terminal wire 6a in the winding start turn is introduced into one shorter-side tooth portion 4b from the radially outermost side of the stator core 4, and the first turn in the first layer is sequentially wound from a radially outer side (1, 1) to a radially inner side (1, 9) of the stator core 4. Here, lane change for moving the winding position radially inward is performed on the one shorter-side tooth portion 4b.

Next, the wire for the second layer is sequentially wound from a radially inner side (2, 1) to a radially outer side (2, 9) of the stator core 4. Also in the second layer, lane change for moving the winding position radially outward is performed on the one shorter-side tooth portion 4b.

Next, at the time of shifting to the shorter-side tooth portion 4b from the longer-side tooth portion 4a when a first turn (3, 1) in a third layer is to be wound from the final turn (2, 9) in the second layer, the wire is wound so as to provide a gap corresponding to one stator coil wire on the radially outermost side on the one shorter-side tooth portion 4b. In addition, at the time of winding from the other shorter-side tooth portion 4b to the longer-side tooth portion 4a, the wire is wound so as to provide a gap corresponding to two stator coil wires on the radially outermost side.

Further, at the time of winding from a second turn (3, 2) to a third turn (3, 3) in the third layer, the wire is sequentially wound from the radially outermost side to the radially inner side of the stator core 4, and lane change is performed on the one shorter-side tooth portion 4b. Thereafter, in the third turn (3, 3) in the third layer, lane change is performed on the other shorter-side tooth portion 4b, from the radially innermost side to the radially outer side at the gap corresponding to two stator coil wires, and then the stator coil is wound to the longer-side tooth portion 4a.

Normally, when a stator coil having a large wire diameter is wound on the radially outermost side, the introduction angle of the stator coil becomes large and the stator coil interferes with the stator core 4 or the bobbin 5, and therefore it is difficult to wind the coil. However, after the coil is wound on the radially inner side of the gap Z2 corresponding to two coil wires, lane change is performed on the longer-side tooth portion 4a from the radially inner side to the radially outer side of the stator core 4, whereby the coil can be wound on the radially outermost side without passing above the final turn (2, 9) in the second layer of the coil.

Thereafter, also for winding from the third turn (3, 3) to a 3.5-th turn (3, 3.5) in the third layer, the wire is wound without passing above the lane change part from the final turn (2, 9) in the second layer to the first turn (3, 1) in the third layer, and the winding end terminal wire 6b from the 3.5-th turn (3, 3.5) is led out from one shorter-side tooth portion 4b.

In addition, in winding from the first turn (3, 1) in the third layer to the third turn (3, 3) in the third layer, cross portions 6c due to lane change formed by turns in the same layer are formed on only the other shorter-side tooth portion 4b opposite to the tooth portion 4b where the terminal wires 6a, 6b are led out. Therefore, the stator coil height on the terminal wire 6a, 6b side becomes lower by about one coil wire than the stator coil height on the opposite side.

Embodiment 2 of the present invention configured as described above provides the effects of embodiment 1 described above, and in addition, provides the following effects.

(10) In winding from the third turn (3, 3) to the 3.5-th turn (3, 3.5) in the outermost layer, lane change is performed on the longer-side tooth portion 4a. Therefore, the wire can be wound without passing above the lane change part from the final turn (2, 9) in the second layer to the first turn (3, 1) in the outermost layer. Thus, the stator coil height is reduced, whereby the size of the rotating electric machine in the axial direction can be reduced.

(11) The winding start terminal wire 6a and the winding end terminal wire 6b are led out from the shorter-side tooth portions 4b opposite to each other. Therefore, the outer diameter size of the stator 3 can be reduced as compared to the case of leading out the terminal wires 6a, 6b from one direction.

(12) The terminal wires 6a, 6b are led out from the shorter-side tooth portions 4b opposite to each other. Therefore, even if there are many slots so that the intervals between the terminal wires would be narrowed, sufficient intervals therebetween can be ensured and insulation between the terminal wires 6a, 6b can be improved.

(13) Further, since the sufficient intervals can be ensured, leading-out of the terminal wires 6a, 6b can be facilitated.

The stator of the rotating electric machine according to the present invention allows a wire having a large wire diameter to be used as the winding of the stator coil, and therefore is suitable for a stator of a vehicular rotating electric machine for low-voltage large-current usage.

Within the scope of the present invention, each of the above embodiments may be modified or simplified as appropriate.

The invention claimed is:
1. A rotating electric machine comprising:
a housing storing an entirety thereof;
a rotor rotatably attached to the housing via a rotational shaft; and
a stator attached to the housing so as to be opposed to an outer circumference of the rotor, wherein
the stator includes: an annular stator core fixed to the housing and having tooth portions forming a plurality of slots; and a plurality of stator coils wound around the tooth portions via bobbins formed from an insulating material made of resin,
each stator coil has a first layer wound around the tooth portion sequentially from a radially outer side to a radially inner side of the stator, and is wound while a winding direction is reversed for each layer, and
if each layer is numbered 1 to n where an outermost layer is denoted by n, where n is an odd number equal to or greater than 3, each turn is numbered 1 to m where a final turn in each layer is denoted by m, where m is equal to or greater than 2, the m-th turn in the n-th layer is wound on a radially outer side of the stator, each stator coil on the radially inner side is lane-changed on a shorter-side tooth portion, and a part of each stator coil on the radially outer side is lane-changed on a longer-side tooth portion.

2. The rotating electric machine according to claim 1, wherein
in winding from a final turn in a (n−1)-th layer to a first turn in the outermost layer of each stator coil, the stator coil is wound from one shorter side to a longer side of the tooth portion, and the winding from the other shorter side to a longer side is performed so as to provide a gap corresponding to at least two wires of the stator coil on the radially outer side.

3. The rotating electric machine according to claim 2, wherein
in winding from a second turn in the outermost layer to the final turn in the outermost layer of each stator coil, the stator coil is sequentially wound from the radially outer side to the radially inner side of the stator, and the stator coil is lane-changed from a radially innermost side to be wound into the gap.

4. The rotating electric machine according to claim 3, wherein
lane change on the longer-side tooth portion is performed at the gap.

5. The rotating electric machine according to claim 1, wherein
in turns in the outermost layer of each stator coil, a cross portion due to lane change formed by turns in the same layer is located on only one shorter-side tooth portion.

6. The rotating electric machine according to claim 1, wherein
a winding start terminal wire in a start turn and a winding end terminal wire in a final turn of each stator coil are led out from the shorter-side tooth portions at both ends in an axial direction along the rotational shaft.

* * * * *